July 22, 1958  N. MOURAVIEFF  2,844,498
METHOD AND MEANS FOR SURFACE-HARDENING OF STEEL
Filed March 9, 1955  2 Sheets-Sheet 1
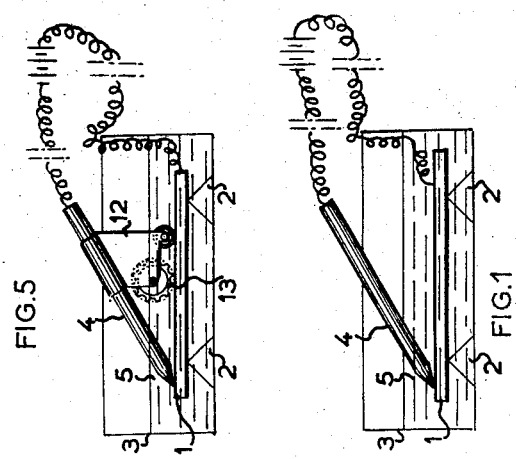
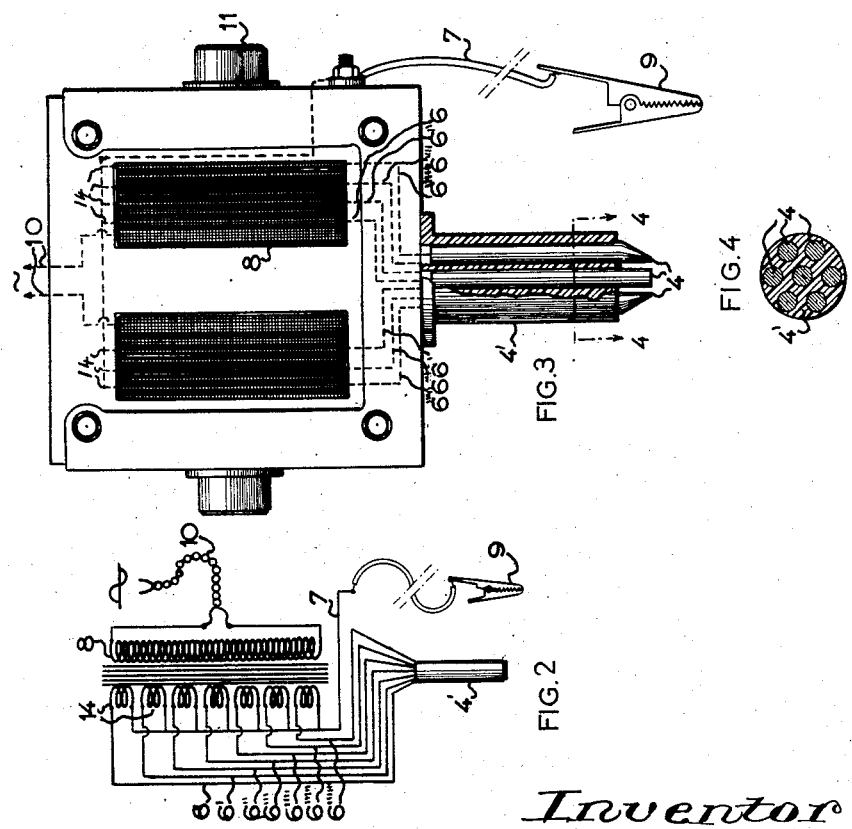
Inventor
N. Mouravieff
By Glascock Downing Diebold
Attys.

July 22, 1958 N. MOURAVIEFF 2,844,498
METHOD AND MEANS FOR SURFACE-HARDENING OF STEEL
Filed March 9, 1955 2 Sheets-Sheet 2

Inventor
N. Mouravieff
By Glenn Downing Tuttle
Attys.

United States Patent Office 2,844,498
Patented July 22, 1958

2,844,498

METHOD AND MEANS FOR SURFACE-HARDENING OF STEEL

Nicolas Mouravieff, Paris, France

Application March 9, 1955, Serial No. 493,205

Claims priority, application France March 18, 1954

4 Claims. (Cl. 148—10.5)

This invention relates to a thermo-electrical treatment of steel adapted to cause a surface transformation producing a layer integral with the metal and the hardness of which is higher than the one obtained with known hardening methods such as case-hardening.

One object of the invention is to scan the steel surface to be treated with a carbon rod and to pass an electric current through said rod and surface in such a manner as to cause generation of an electric arc to thereby subject each successive zone of contact to a surface-hardening treatment.

Another object of the invention is to effect the said scanning of the surface to be treated by the said carbon rod under a very slight mechanical pressure to thereby make the electrical contact between the rod and the steel surface as poor as possible to facilitate the generation of the above mentioned arc.

The above mentioned surface hardening treatment of each successive area of a steel surface includes heating and absorption of carbon from the carbon rod due to the action of the arc.

A further object of the invention is to effect the above described process, while the steel surface is immersed in an uninflammable liquid, such as water, whereby the heating of each successive area of the steel surface under carbon absorption is immediately followed by rapid cooling having a tempering effect.

The main advantages of the surface-hardening method according to the invention are, that of causing no substantial deformation of the part subjected to the treatment, the possibility of treating parts of considerable size, as well as of treating, if required, only a certain well-defined area of a part and, last but not least, that of being well adapted to the treatment of any kind of steel and, in particular, to soft steel.

A more specific object of the invention is to provide a method for surface-hardening of steel comprising the above described steps effected simultaneously and wherein the scanning of the surface by the carbon rod is effected at such a speed and with an electric current of such a power that the displacement of the rod across the irregularities of the surface causes a succession of breaking arcs at a sufficiently high rate to determine no interruption in the surface-hardening treatment.

An additional object of my invention is to provide a steel surface, before subjecting the same to the above-described treatment, with corrugations or the like extending transversely to the direction of scanning to thereby regulate the generation of the above-mentioned breaking arcs.

Another specific object of the invention is to use, in the above-described method, an electric current of such a power that it generates a continuous arc between the rod and the treated surface, due to the insufficient contact area therebetween.

Another object of the invention is to provide a device for treating steel surfaces by the above described surface hardening method, the said device essentially comprising a tank containing a bath of non-inflammable liquid to immerse the said part to be treated, a carriage, means to elastically support the above mentioned carbon rod on said carriage in such a position that its free end may be caused to scan the steel surface to be treated under a slight mechanical pressure, a source of electric current, an electric circuit passing through said rod and said surface to feed the same with current from said source and means operatively connected with said carriage to displace said carbon rod to permit scanning the whole area of said surface.

A further object of the invention is to provide a device of the type described, wherein said source of electric current is of such power and wherein said displacement means are designed to move said carbon rod at such a speed, that the scanning of said surface by said carbon rod gives rise to a series of arcs succeeding at a rate sufficiently high to cause no interruption in the surface hardening treatment.

The above mentioned successive arcs are automatically generated as the carbon electrode scans the surface to be treated, due to a succession of contact breaks resulting from the irregularities of the said surface. However, in certain cases, in particular, when the treatment is applied to a part to be made smooth by machining after the treatment, it is advantageous to regulate the contact breaking sequence.

For this purpose, another object of the invention is to provide, in the above described device, means to impart the carbon electrode with a succession of periodical skips of small amplitude to thereby generate a sequence of breaking arcs.

Other objects and advantages of the invention will be apparent from the following detailed description, together with the accompanying drawings, submitted for purposes of illustration only and not intended to define the scope of the invention, reference being had for that purpose to the subjoined claims.

In these drawings:

Figure 1 is a diagrammatical view illustrating the principle of the surface-hardening method according to the invention.

Figure 2 is a wiring diagram of an electric system to be used in a device according to the invention.

Figure 3 is a partial longitudinal cross-section of an embodiment of the system of Figure 2.

Figure 4 is a sectional view along line 4—4 of Figure 3.

Figure 5 is a diagrammatical view of an alternative embodiment of the device according to the invention, and, Figure 6 is an elevational, partly sectional, diagrammatical view of a constructive embodiment of a device for treating steel according to the invention.

Figure 6:
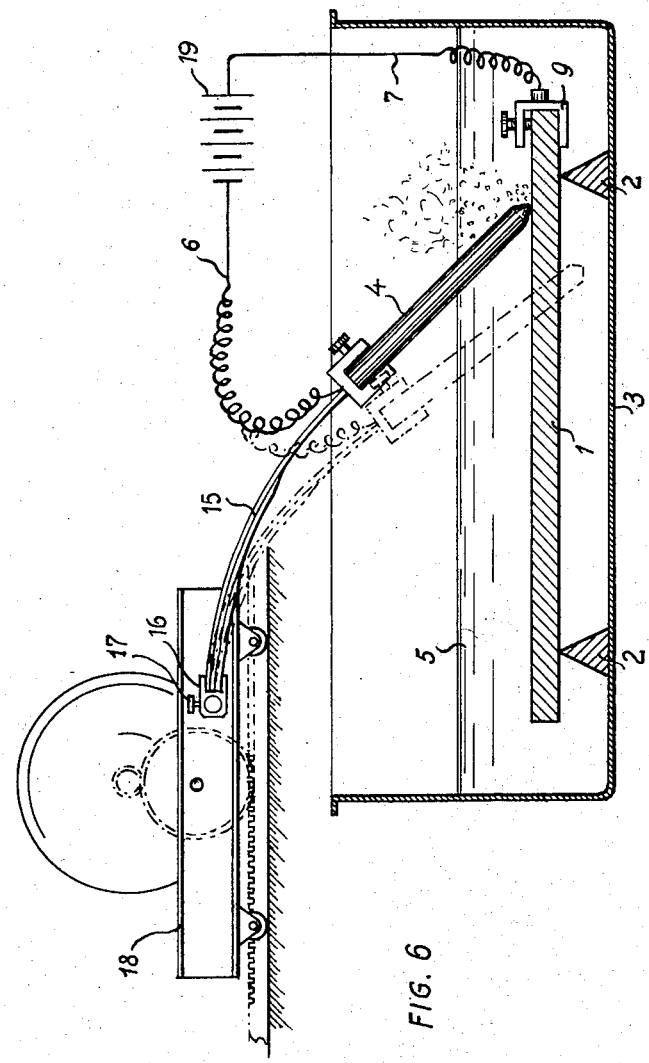

Referring first to Figures 1 and 5, there is shown at 1 a steel part, the surface of which is to be hardened by the method according to the invention. The said part 1 is disposed on supports 2 in a tank 3 containing a bath of uninflammable liquid, such as water. 4 is a carbon rod, preferably of the type used for brushes or the like. The carbon rod 4 is electrically connected with one pole of a suitable source of electric current, the other pole being connected with the part 1 to be treated. The part 1 and the carbon electrode 4 are in contact with each other under the level of the liquid bath 5 contained in the tank 3. With this arrangement, when the carbon electrode 4 is swept along the surface of the part 1, under but a very slight mechanical pressure, at a suitable speed, there are obtained a plurality of contact breaks between 4 and 1, due to the small skips of the carbon electrode resulting from the irregularities of the surface, the said breaks giving rise to instantaneous arcs under the surface of the liquid bath 5. According to the invention, the said arcs ensure the hardening of a superficial layer of the part 1. The thickness of the said layer primarily depends upon the power of the current used.

Figure 5 shows the same device completed by a carriage 12 on which is freely rotated a small toothed-wheel 13 that, when rolling on the surface of the part 1, imparts slight skips to the electrode 4, thus producing contact breaks between 1 and 4. The breaks are thus mechanically regulated, which permits obtaining a more uniform treated layer.

There is shown at 4' in Figure 2 an electrode-carrier adapted to receive several carbon electrodes which are insulated from each other by a suitable material. Each one of said electrodes is connected by means of a lead (6, 6', 6'', 6''', 6'''', 6''''', 6'''''') to one of the seven secondary windings 14 of a transformer, the primary winding 8 of which is fed from the mains through a cable 10. The free ends of the secondary windings 14 are multipled to a terminal clamp 9 for establishing contact with the part 1. This device permits obtaining simultaneously seven instantaneous arcs which are either separate or wholly or partly merged into each other. This ensures a more rapid and uniform treatment.

As shown in Figure 4, this multiple-electrode device is preferably designed under the shape of a common insulating head, wherein the seven carbon electrodes are embedded. The said electrodes are disposed as close as possible to each other. Their spacing has been exaggerated in the drawing for the sake of clearness.

In Figure 6, there are shown at 3 and 5, as previously, a tank and a liquid bath in which a steel part 1 is immersed. In the example shown, this part is a plate, the upper surface of which is to be hardened. A wire 7 is provided to connect the said part to a source of electric current, diagrammatically shown, in the drawings, under the shape of a battery 19. The other pole of the battery 19 is electrically connected with the carbon electrode 4. The said electrode 4 is suspended by means of several spring leaves 15 to an arm 16 articulated on a carriage 18 (this drawing is merely diagrammatic and the elements have not been shown with their real relative dimensions).

There is shown in dot-dash line the position which would be assumed by the carbon electrode 4 in the absence of the part 1 (with an exaggerated shift). Thus, it may be seen that in the full line position shown in Figure 6, the carbon electrode 4 is slightly pressed on the surface to be treated. By a suitable adjustment of the screw 17, it is possible to reduce the pressure to a negligible value. With this arrangement, it will be easily understood that if the plate is not perfectly flat or levelled, the carbon electrode 4 will nevertheless scan the whole area of the surface to be treated.

It is to be understood that the invention is not limited to the examples described and shown and that it may be affected with numerous modifications within the reach of those skilled in the art without departing from the spirit of the invention.

In particular, it is possible to use in a device for treating steel according to the invention any number of carbon electrodes of any suitable shape and quality.

Moreover, if required the part to be treated may be imparted with a suitable displacement instead of or in addition to the motion of the carbon electrode or electrodes.

For example, a cylindrical surface will be most conveniently scanned by combining a rotation of the said surface around its revolution axis with a translation of an electrode in a direction parallel to said axis, the combination of both motions resulting in a helical scanning path of the electrode on the cylindrical surfaces.

What is claimed is:

1. A method for hardening a steel surface consisting in scanning the said surface with at least one carbon electrode in a mass of uninflammable liquid, while passing an electric current through said electrode and said surface so as to generate a traveling arc, whereby each successive scanned area of said surface is heated and treated with carbon from said electrode and then tempered under the cooling action of said liquid, said electric current having such a power and said scanning being effected at such a speed, that it determines a succession of arcs due to contact breaks resulting from the irregularities of said surface, said surface being previously provided with corrugations extending transversely to the direction of scanning of said electrode so as to regulate the generation of breaking arcs by creating artificially additional surface irregularities.

2. A method for hardening a steel surface by scanning the said surface with at least one carbon electrode in a bath of uninflammable liquid while passing an electric current through said electrode and said surface so as to apply heat to said surface, consisting in providing said surface with artificial irregularities along the scanning path of said electrode, and in scanning said surface at such a speed and with such an electric current power as to create a succession of arcs due to the contact breaks resulting from said artificial irregularities, whereby each successive scanned area of said surface is heated by said succession of arcs, treated with carbon from said electrode by means of said succession of arcs, and then tempered under the cooling action of said liquid.

3. A device for hardening a steel surface, comprising in combination a tank to contain a bath of uninflammable liquid to immerse the steel part to be treated, a carriage, at least one carbon electrode, means to elastically suspend the said electrode on said carriage so that its free tip may be caused to scan the surface of said steel part under a negligible pressure, source of electric current, an electric circuit to feed current from said source through said electrode and said surface and motor means operatively connected with said carriage to displace said carbon electrode for complete scanning of the whole area of said surface, and means to impart said carbon electrode with a regular succession of skips as it is swept along said surface, to thereby regulate the sequence of contact breaks due to said scanning.

4. A device for hardening a steel surface comprising, in combination, a tank to contain an uninflammable liquid bath to immerse the steel piece to be treated, a carriage, at least one carbon electrode, means to elastically suspend the said electrode on said carriage, so that its free tip may be caused to scan the surface of said steel piece under a slight pressure, a source of electric current, an electric circuit to feed current from said source through said electrode and said surface, motor means operatively connected with said carriage to displace said carbon electrode for complete scanning of the whole area of said surface, and means to impart said carbon electrode with a succession of skips as it is swept along said surface, whereby said source of electric current has such a power and said motor means are designed to move said carbon electrode at such a speed that, due to said skip imparting means, the scanning of said surface by said carbon electrode results in the striking of a series of arcs succeeding at a rate sufficiently high to ensure uninterrupted action of said arcs.

References Cited in the file of this patent

UNITED STATES PATENTS

| | | |
|---|---|---|
| 687,612 | Davis | Nov. 26, 1901 |
| 1,866,538 | Andrus | July 12, 1932 |
| 2,320,327 | Meduna | May 25, 1943 |

FOREIGN PATENTS

| | | |
|---|---|---|
| 340,530 | Great Britain | Dec. 29, 1930 |
| 825,036 | France | Nov. 27, 1937 |